United States Patent [19]

Wolfe, Jr.

[11] 3,727,773
[45] Apr. 17, 1973

[54] LIFT TABLE
[75] Inventor: Maston B. Wolfe, Jr., Dallas, Tex.
[73] Assignee: Standard Manufacturing Company, Incorporated, Dallas, Tex.
[22] Filed: Aug. 5, 1970
[21] Appl. No.: 61,230

[52] U.S. Cl. .................. 214/1 D, 214/1 Q, 214/130
[51] Int. Cl. ............................................ B66c 23/56
[58] Field of Search .............. 214/1 Q, 130, 1 R, 214/1 D, 1 SW, 1 A, 502, 314, 317, 318, 700

[56] References Cited

UNITED STATES PATENTS

| | | | |
|---|---|---|---|
| 2,411,821 | 11/1946 | Choat | 214/1 Q X |
| 2,828,869 | 4/1958 | Corley | 214/1 SW |
| 3,418,671 | 12/1968 | Marotta | 214/1 A X |
| 3,484,004 | 12/1969 | Hughey | 214/1 D X |
| 1,870,097 | 8/1932 | Coller | 214/384 |
| 2,038,233 | 4/1936 | Oppenheim | 9/39 |
| 3,327,879 | 6/1967 | Lull | 214/147 R X |

FOREIGN PATENTS OR APPLICATIONS

| | | | |
|---|---|---|---|
| 218,838 | 12/1961 | Austria | 214/318 |

Primary Examiner—Robert G. Sheridan
Assistant Examiner—Frank E. Werner
Attorney—Richards, Harris and Hubbard

[57] ABSTRACT

A lift table includes a receiving and supporting assembly and at least one lifting arm that extends perpendicularly to the receiving and supporting assembly. The assembly and the arm are mounted on a frame for pivotal movement between an article supporting positon, wherein the receiving and supporting assembly extends horizontally and the lifting arm extends vertically, and an article receiving position, wherein the lifting arm extends horizontally and the receiving and supporting assembly extends vertically. While the assembly is in the latter position, an article is attached to the lifting arm. Then, the assembly is pivoted to the article supporting position. During this movement, the receiving and supporting assembly moves under the article, so that the article is transferred from the lifting arm to the receiving and supporting assembly.

15 Claims, 9 Drawing Figures

INVENTOR
MASTON B. WOLFE, JR.

*Richards, Harris & Hubbard*
ATTORNEY

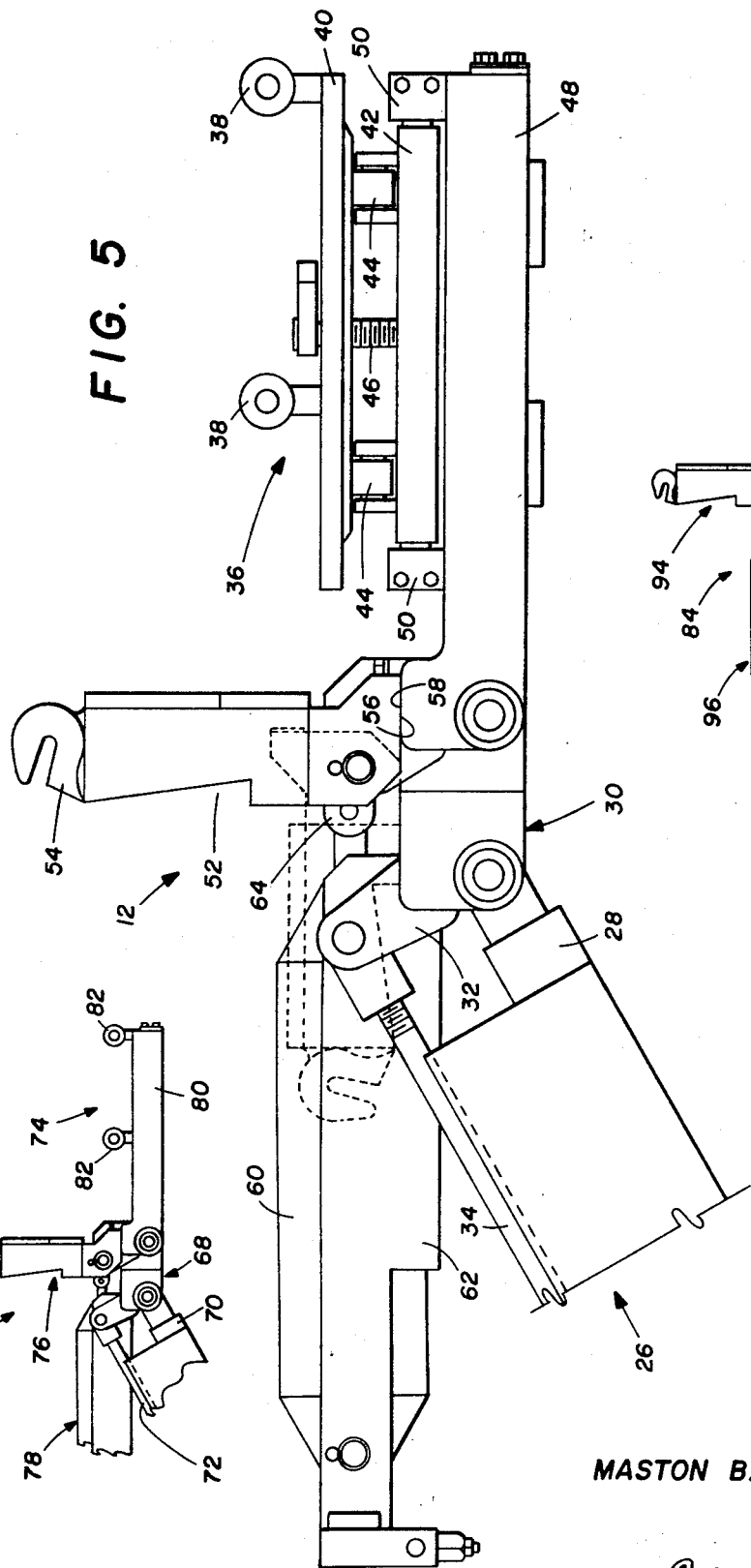

INVENTOR
MASTON B. WOLFE, JR.

Richards, Harris & Hubbard
ATTORNEY

LIFT TABLE

BACKGROUND OF THE INVENTION

In the field of aerial weaponry, weapons such as bombs, rockets, and the like are secured to aircraft by the interengagement of lugs on the weapons and attaching members on the aircraft. Although aerial weapons frequently weigh as much as several tons, they must be positioned very accurately relative to an aircraft before their lugs can mate with the attaching members on the aircraft. For this reason, aerial weapons are usually mounted on aircraft by means of a lift table.

Lift tables suitable for use in handling aerial weapons are typically mounted on lift trucks and function to permit relative movement between an aerial weapon supported on the table and the lift truck. The lift tables may include hydraulic actuators, or they may be manually operable. In either case, lift tables provide for the movement of weapons in as many as six directions, i.e., linear movement along and rotational movement about three mutually perpendicular axes.

In the past, lift tables have comprised low profile devices adapted for direct engagement with suitably supported weapons. However, weapons are frequently stored in such a way that they can not be directly engaged by a conventional lift table. For example, weapons may be stored on a flat surface, or they may be stored in racks which do not permit sufficient clearance for direct engagement by a conventional lift table. In such a case, it has heretofore been necessary to transfer the weapon to a suitable support before engaging the weapon with a lift table.

This invention relates to a lift table adapted for direct engagement with articles supported in such a way that they cannot be directly engaged by conventional lift tables. The lift table includes at least one lifting arm that is initially secured to an article and a receiving and supporting assembly that receives the article from the lifting arm. The use of the invention eliminates the necessity of transferring an article to a suitable support prior to engagement of the article by a lift table.

SUMMARY OF THE INVENTION

In accordance with the preferred embodiment of the invention, a lift table includes a receiving and supporting assembly and a lifting arm. The lift table is initially moved to an article receiving position, and an article is secured to the lifting arm. Then, the lift table is moved to an article supporting position. During this movement, the article is transferred from the lifting arm to the receiving and supporting assembly.

DESCRIPTION OF THE DRAWINGS

A more complete understanding of the invention may be had by referring to the following detailed description when taken in conjunction with the drawings, wherein:

FIG. 5 is an enlarged side view of the lift table showing the details thereof;

FIG. 6 is a side view of a second embodiment of the invention;

FIG. 7 is a side view of a third embodiment of the invention;

DETAILED DESCRIPTION

Figure 1:
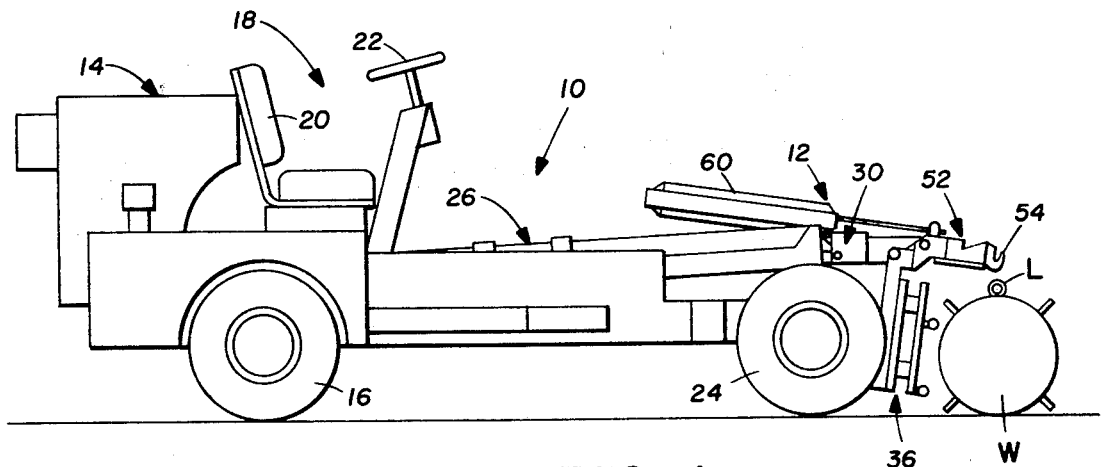
FIG. 1 is a side view of a lift truck including a lift table employing the present invention.

Referring now to the drawings, and particularly to FIG. 1 thereof, there is shown a lift truck 10 including a lift table 12 employing the present invention. The lift truck 10 includes an engine 14 that is coupled to a pair of rear drive wheels 16 through a hydrostatic drive unit (not shown). A driving compartment 18 is positioned over the hydrostatic drive unit and includes a seat 20 and a steering wheel 22 is coupled to a pair of forward steering wheels 24. The lift table 12 is supported over the forward wheels 24 by a hydraulically operated table lifting assembly 26.

Referring now to FIG. 5, the table lifting assembly 26 includes a pair of booms 28, only one of which is shown. The lift table 12 includes a frame 30 which is pivotally connected to the booms 28 of the assembly 26. The frame 30 includes a pair of ears 32 which extend upwardly from the frame and which are connected to a pair of tension rods 34, only one of which is shown. The tension rods 34 comprise portions of the table lifting assembly 26 and cooperate with the booms 28 to maintain the frame 30 in the orientation shown in FIG. 5 regardless of the vertical positioning of the lift table 12 as controlled by the table lifting assembly 26.

The lift table 12 further includes a receiving and supporting assembly 36. The assembly 36 includes a plurality of weapon engaging rollers 38 which are selectively positioned in various apertures formed in a plate 40 depending upon the size of a particular weapon to be handled by the lift table 12. In the use of the receiving and supporting assembly 36, the rollers 38 support an aerial weapon for rotation about a horizontal axis extending parallel to the axes of the rollers 38.

The plate 40 is supported on an intermediate frame 42 by a pair of hinges 44 and a screw 46. The hinges 44 and the screw 46 permit rotation of a weapon supported on the rollers 38 about an axis extending parallel to the axes of the hinges 44. The intermediate frame 42 is in turn supported on a main frame 48 by a plurality of bearing blocks 50. The bearing blocks 50 permit rotation of a weapon supported on the rollers 38 about a vertical axis. Thus, the various components of the receiving and supporting assembly 38 permit rotation of a weapon about three mutually perpendicular axes.

The main frame 48 of the assembly 36 includes a pair of rack and pinion assemblies (not shown). The rack and pinion assemblies cooperate to permit movement of the bearing blocks 50 in mutually perpendicularly directions relative to the plane of the main frame 48. The vertical position of the plane of the main frame 48 is controlled by the table lifting assembly 26 of the lift truck 10. Thus, by means of the lift truck 10 and the various components of the receiving and supporting assembly 36, an aerial weapon supported on the lift table 12 can be rotated about three mutually perpendicular axes and can be moved in three mutually perpendicular directions.

The lift table 12 further includes a pair of lifting arms 52, only one of which is shown. The arms 52 include weapon engaging hooks 54 and are pivotally supported on the main frame 48 of the receiving and supporting assembly 36 for movement between the position shown in full lines in FIG. 5 and the position shown in dashed lines therein. When the arms 52 are in the position shown in full lines, they are located by cooperating locating surfaces 56 and 58 on the arms and on the main frame 48, respectively, and extend adjacent to and away from the receiving and supporting assembly 36 of the lift table 12.

The receiving and supporting assembly 36 and the lifting arms 52 of the lift table 12 are supported for pivotal movement relative to the frame 30 upon operation of a hydraulic cylinder 60. The cylinder 60 is connected between a bracket 62 comprising an extension of the frame 30 and a bracket 64 secured to the main frame 48 of the receiving and supporting assembly 36. Upon actuation, the cylinder 60 pivots the assembly 36 and the arms 52 through an arc of about 90°. That is, by operating the cylinder 60, the receiving and supporting assembly 36 and the lifting arms 52 can be pivoted from the supporting position shown in FIG. 5, wherein the arms 52 extend vertically and the assembly 36 extends horizontally, to a receiving position wherein the arms 52 extend horizontally and the assembly 36 extends vertically.

The operation of the lift table 12 is shown in FIGS. 1, 2, 3, and 4. Initially, the hydraulic cylinder 60 is operated to position the receiving and supporting assembly 36 and the lifting arms 52 in the weapon receiving position shown in FIG. 1. At the same time, the lift truck 10 is operated to position the lift table 12 adjacent a weapon W that is supported on a surface, or that is otherwise supported in such a way that the receiving and supporting assembly 36 of the lift table 12 cannot be positioned under it. The hooks 54 of the lifting arms 52 are then secured to the lugs L of the weapon W by a chain C, and the table lifting mechanism 26 of the truck 10 is operated to lift the weapon W in the manner shown in FIG. 2.

Figure 2:
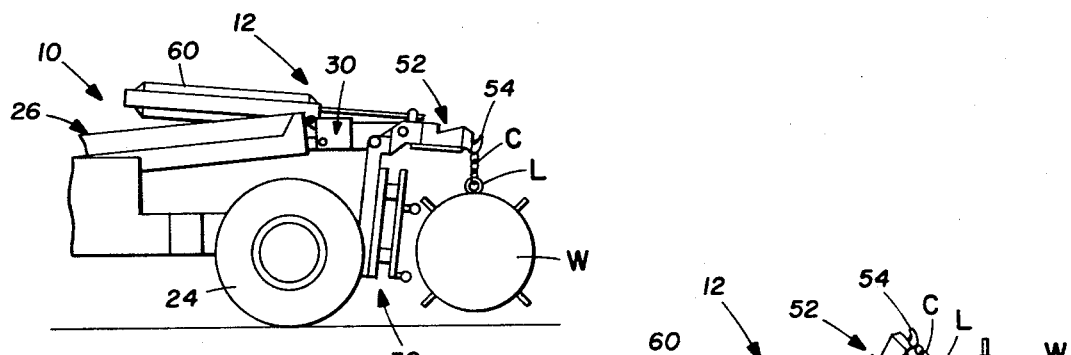
FIGS. 2, 3 and 4 are schematic views illustrating the operation of the lift table assembly shown in FIG. 1.
Figure 3:
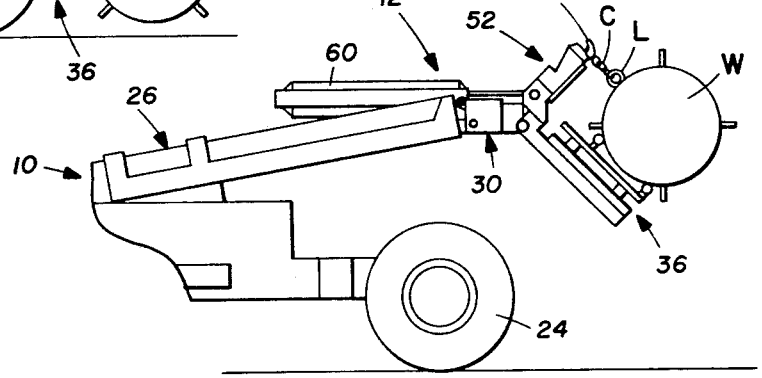
Figure 4:
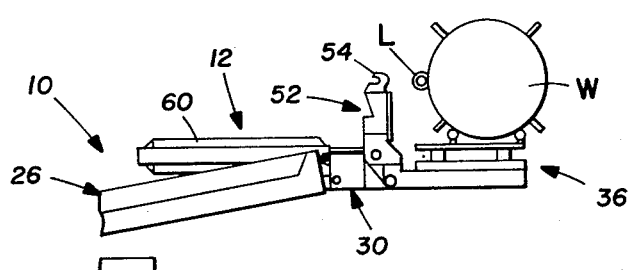

When the weapon W is secured to and supported by the lifting arms 52 of the lift table 12, the hydraulic cylinder 60 of the lift table 12 is actuated to pivot the lifting arms 52 and the receiving and supporting assembly 36 from the weapon receiving position shown in FIGS. 1 and 2 to the weapon supporting position shown in FIGS. 4 and 5. During the movement of the arms 52 and the assembly 36 from the weapon receiving position to the weapon supporting position, the receiving and supporting assembly 36 moves under the weapon W in the manner shown in FIG. 3, so that the weapon W is transferred from the arms 52 to the assembly 36.

When the components of the lift table 12 are in the weapon supporting position shown in FIG. 4, the chain C is removed. Then, the various components of the receiving and supporting assembly 36 are manipulated to properly position the lugs L of the weapon W to the weapon attaching members of an aircraft (not shown). During this action, the lifting arms 52 of the lift table 12 may be pivoted to the position shown in dashed lines in FIG. 5, if desired.

Referring now to FIG. 6, there is shown a lift table 66 comprising a second embodiment of the invention. The lift table 66 is similar to the lift table 12 in that it includes a frame 68 that is supported on a pair of booms 70 and a pair of tension rods 72, a receiving and supporting assembly 74 and a pair of lifting arms 76. The assembly 74 and the arms 76 are mounted for pivotal movement relative to the frame 68 upon operation of a hydraulic cylinder 78.

The difference between the lift table 66 and the lift table 12 comprises the structure of the receiving and supporting assembly 74. It has been found that in some instances, weapons can be secured to the weapon attaching members of an aircraft without the use of the various motions provided by the components of the receiving and supporting assembly 36. Thus, the receiving and supporting assembly 74 comprises a plate 80 and a plurality of weapon engaging rollers 82 that are selectively positioned in various apertures formed in the plate 80 depending upon the size of the weapon to be handled by the lift table 66. The operation of the lift table 66 is identical to the operation of the lift table 12, except that weapons supported on the rollers 80 are manipulated relative to the attaching members of an aircraft by manipulating the entire lift table, rather than by manipulating the component parts of the receiving and supporting assembly 74.

Referring now to FIG. 7, a lift table 84 comprising a third embodiment of the invention is shown. The lift table 84 is similar to the lift tables 12 and 66 in that it includes a frame 86. The frame 86 is supported on a pair of booms 88 and a pair of tension rods 90, and in turn supports a receiving and supporting assembly 92 and a pair of lifting arms 94. The assembly 92 and the arms 94 are mounted for pivotal movement relative to the frame 86 upon operation of a hydraulic cylinder 96.

The lift table 84 differs from the lift tables 12 and 66 in that the receiving and supporting assembly 92 comprises a pair of conventional lift forks 98. In the operation of the table 84, the cylinder 96 is operated to position the forks 98 vertically and the arms 94 horizontally. Then, the table 84 is positioned adjacent an article that is supported on a surface, or that is otherwise supported so that the forks 98 cannot be manipulated under it.

When the table 84 is positioned adjacent the article, the arms 94 are secured thereto and the table 84 is lifted to clear the article of any obstructions. Then, the cylinder 96 is operated to pivot the forks 98 and the arms 94 to the position shown in FIG. 7. During the movement of the forks 98 and the arms 94, the forks 98 move under the article so that the article is transferred from the arms 94 to the forks 98. Thereafter, the article is disengaged from the arms 94, and the lift table 84 is manipulated in the manner of a conventional forklift truck.

Figure 9:
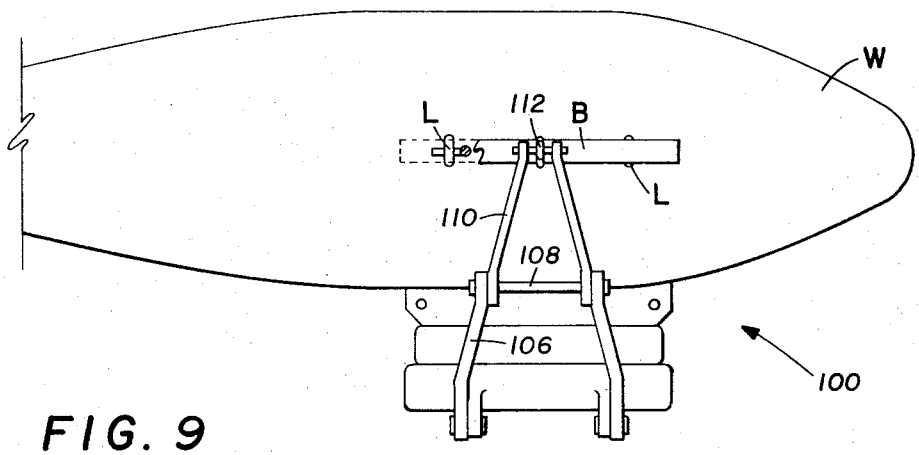
FIG. 9 is a top view of the embodiment shown in FIG. 8.
Figure 8:
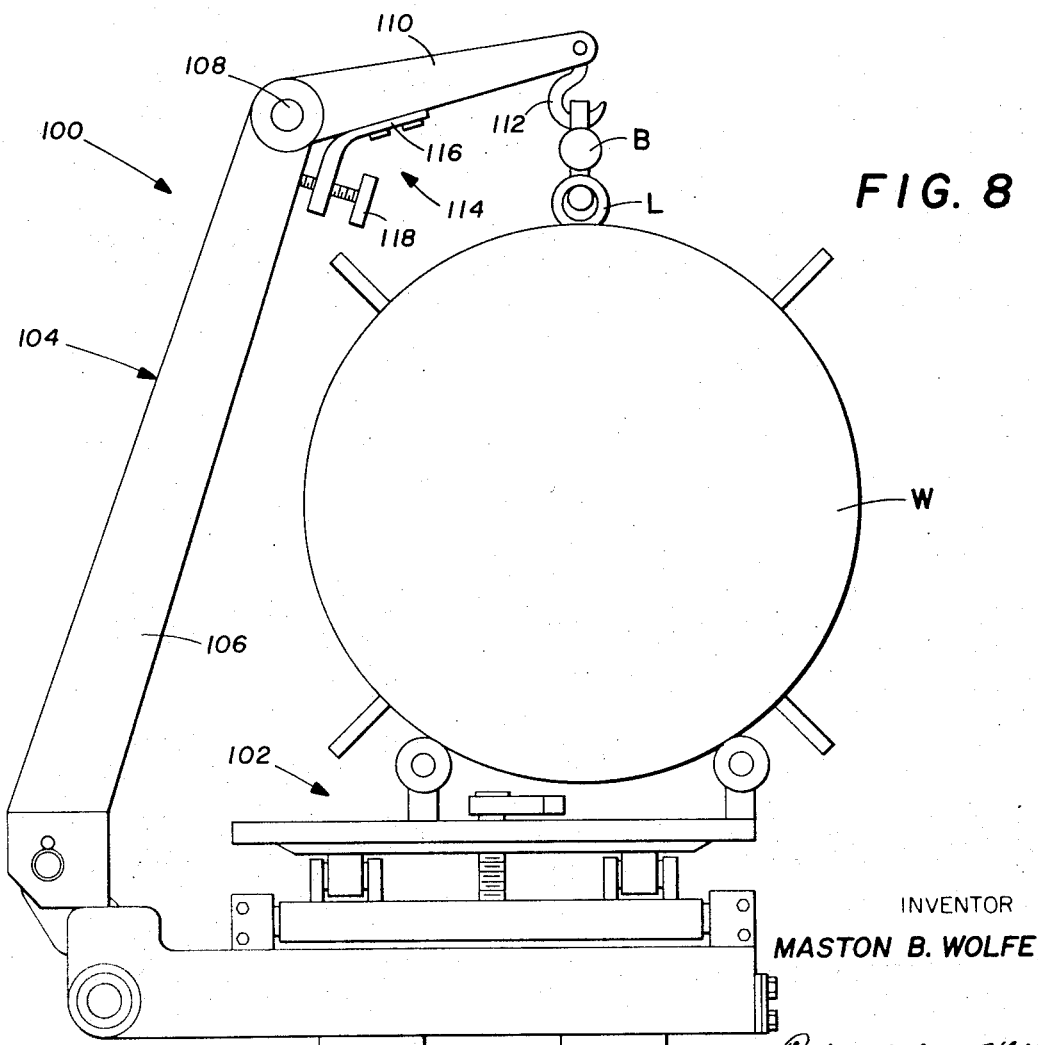
FIG. 8 is a side view of a fourth embodiment.

Referring now to FIGS. 8 and 9, a lift table 100 comprising a fourth embodiment of the invention is shown. The lift table 100 includes a receiving and supporting assembly 102 which is constructed, supported and manipulated identically to the supporting and receiving assembly 36 of the lift table 12. The lift table 100 further includes a lifting arm 104 that is positioned adjacent to and that extends over the weapon receiving and supporting assembly 102.

The arm 104 includes a pair of beams 106 that are pivotally connected to the weapon receiving and supporting assembly 102 and that extend to a pivotal shaft 108. A pair of beams 110 extend from the pivot shaft 108 to a hook 112. The position of the beams 110 relative to the beams 106 is controlled by an adjusting assembly 114 including a bracket 116 and a screw 118.

In the use of the lift table 100, the weapon receiving and supporting assembly 102 and the weapon lifting arm 104 are pivoted through an arc of about 90° until the assembly 102 extends vertically and the arm 104 extends horizontally. Then, a conventional lug beam B is connected between the hook 112 of the arm 104 and the lugs L of a weapon W. After the weapon W is connected to the arm 104, the weapon receiving assembly 102 and the arm 104 are pivoted to the weapon supporting position shown in FIG. 8, wherein the assembly 102 extends horizontally and the arm 104 extends vertically. During this movement, the assembly 102 moves under the weapon W so that the weapon W is transferred from the arm 104 to the assembly 102. When the table 100 is in the position shown in FIGS. 8 and 9, the arm 104 is disconnected from the weapon W by removing the lug beam B. Thereafter, the beams 110 may be pivoted relative to the beams 106, or the entire arm 104 may be pivoted relative to the receiving and supporting assembly 102, if desired.

It will be understood that various modifications can be made in each of the embodiments shown in the drawings. For example, any of the numerous conventional cables, clamps, etc. can be employed in any of the embodiments instead of the chains and lug beams disclosed. Also, the weapon manipulation mechanisms of the several conventional lift tables can be utilized as the receiving and supporting assembly of any of the embodiments.

The use of the present invention is advantageous in that it eliminates the necessity of positioning an article on a rack, a pallet, or the like before the article can be mounted on a receiving and supporting assembly. Instead, the article is secured to the lifting arms of the lift table and is transferred from the lifting arms to the receiving and supporting assembly. Thereafter, the article is manipulated by the receiving and supporting assembly in the conventional manner.

Although specific embodiments of the invention are illustrated in the drawings and described herein, it will be understood that the invention is not limited to the embodiments disclosed, but is capable of rearrangement, modification and substitution of parts and elements without departing from the spirit of the invention.

What is claimed is:

1. A lift table comprising:
    an assembly including an article receiving and supporting member, an article lifting member, means secured to the article lifting member for connecting an article thereto, and means on the article receiving and supporting member for receiving and supporting an article secured to the lifting member and for selectively varying the orientation of the article relative to the assembly; and
    means for moving the assembly between an article receiving position wherein the article lifting member extends outwardly and an article supporting position wherein the article receiving and supporting member extends under the article lifting supporting member.

2. The lift table according to claim 1 wherein the moving means positions the article receiving and supporting member under the article lifting member as the assembly is moved from the article receiving position to the article supporting position.

3. The lift table according to claim 1 wherein the article receiving and supporting member and the article lifting member are generally perpendicular to each other and wherein the moving means pivots the assembly between positions wherein the members extend in generally perpendicular directions.

4. A lift table comprising:
    an article lifting and supporting mechanism including a normally upwardly extending lifting member and a normally horizontally extending receiving and supporting member;
    means for pivoting the article lifting and supporting mechanism between the normal position and an article receiving position wherein the lifting member extends outwardly and the receiving and supporting member extends vertically;
    means for connecting aerial weapons to the lifting member when the article lifting and supporting mechanism is in the article receiving position; and
    means mounted on the receiving and supporting member for receiving weapons connected to the lifting member as the lifting member is returned to the normal position by the pivoting means and for permitting selective rotation of the weapons about their axes.

5. The lift table according to claim 4 wherein the connecting means comprises a lug beam.

6. The lift table according to claim 4 wherein the lifting and supporting mechanism comprises means for connection to an article and a pair of lift forks.

7. A lift table comprising:
    a frame;
    an article receiving and supporting assembly pivotally mounted on the frame and including an article supporting portion;
    an article lifting arm pivotally mounted on the receiving and supporting surface and extending adjacent to and away from the article supporting portion thereof;
    means secured to the lifting arm for connecting an article thereto; and
    means for pivoting the article receiving and supporting assembly relative to the frame between an article receiving position wherein the article lifting arm extends outwardly from the frame and an article supporting position wherein the article supporting portion extends outwardly from the frame and under the article lifting arm.

8. The lift table according to claim 7 wherein the frame is mounted on a vehicle that includes means for raising and lowering the frame.

9. A lift table comprising:
    an initially vertically extending article receiving member;
    an article lifting arm mounted on the receiving member and initially extending outwardly therefrom;
    connecting means secured at one end to the lifting arm and secured at the other end to an article;
    means for pivoting the receiving member and the lifting arm into an orientation wherein the lifting arm extends upwardly and the receiving member extends horizontally and thereby positioning the receiving member under and in supporting engagement with the article; and means mounted on the article receiving member for receiving an article secured to the connecting means as the article receiving member is positioned horizontally by the pivoting means and adapted for subsequent selective repositioning of the received article relative to the receiving member.

10. The lift table according to claim 9 wherein the lifting arm includes a hook and wherein the connecting means comprises a chain secured in the hook of the lifting arm.

11. The lift table according to claim 9 wherein the connecting means comprises a lug beam.

12. The lift table according to claim 9 wherein the lifting arm is adapted for movement between normal and inoperative positions relative to the receiving member.

13. A lift table comprising:

an article receiving and supporting member;

means for pivoting the article receiving and supporting member between a vertical orientation and a horizontal orientation;

means for connecting an article to the article receiving and supporting member when it is in the vertical orientation; and means mounted on the article receiving and supporting member for receiving and supporting the article as it is moved to the horizontal orientation by the pivoting means and for thereafter permitting selective repositioning of the article relative to the article receiving and supporting member.

14. The lift table according to claim 13 wherein the repositioning means comprises roller means adapted to receive cylindrical articles and to permit selective rotation thereof about their respective axes.

15. The lift table according to claim 13 wherein the connecting means comprises an arm extending from the article receiving and supporting member and means for connecting an article to the arm.

* * * * *